(12) United States Patent
Yoshioka et al.

(10) Patent No.: US 9,536,272 B2
(45) Date of Patent: Jan. 3, 2017

(54) INFORMATION PROCESSING APPARATUS, METHOD AND COMPUTER-READABLE MEDIUM

(75) Inventors: Shigeatsu Yoshioka, Kanagawa (JP); Yoichi Mizutani, Saitama (JP)

(73) Assignee: SONY CORPORATION, Tokyo (JP)

( * ) Notice: Subject to any disclaimer, the term of this patent is extended or adjusted under 35 U.S.C. 154(b) by 486 days.

(21) Appl. No.: 12/899,693

(22) Filed: Oct. 7, 2010

(65) Prior Publication Data
US 2011/0128366 A1 Jun. 2, 2011

(30) Foreign Application Priority Data
Nov. 30, 2009 (JP) ................................. 2009-272813

(51) Int. Cl.
H04N 9/07 (2006.01)
G06T 1/00 (2006.01)
G06F 3/0354 (2013.01)
G06F 3/0484 (2013.01)
G06F 3/0485 (2013.01)

(52) U.S. Cl.
CPC ............. G06T 1/00 (2013.01); G06F 3/03543 (2013.01); G06F 3/0485 (2013.01); G06F 3/04845 (2013.01); G06F 2203/04806 (2013.01)

(58) Field of Classification Search
None
See application file for complete search history.

(56) References Cited

U.S. PATENT DOCUMENTS

| 5,530,455 A * | 6/1996 | Gillick et al. ................ 345/163 |
| 6,407,749 B1 * | 6/2002 | Duke ............................ 345/684 |
| 8,264,524 B1 * | 9/2012 | Davey ............................. 348/36 |
| 2004/0167806 A1 | 8/2004 | Eichhorn et al. |
| 2004/0189802 A1 * | 9/2004 | Flannery ....................... 348/143 |
| 2005/0022236 A1 * | 1/2005 | Ito et al. ......................... 725/39 |
| 2008/0259097 A1 * | 10/2008 | Hara ............................. 345/660 |
| 2010/0053154 A1 * | 3/2010 | Horvitz et al. ............... 345/419 |

FOREIGN PATENT DOCUMENTS

| CN | 101183295 | 5/2008 |
| JP | 05-080853 | 4/1993 |

(Continued)

OTHER PUBLICATIONS

Ishak et al., Content-Aware Scrolling, Oct. 2006, US Association for Computing Machinery.*

(Continued)

*Primary Examiner* — James M Anderson, II
(74) *Attorney, Agent, or Firm* — K&L Gates LLP

(57) ABSTRACT

In one example embodiment, an information processing apparatus causes a display device to display a first image in a display range. In this embodiment, the first image is from images associated with an observation target object. The images include a first image, a second image, and a third image. In response to a request to change the display range, the information processing apparatus changes the display range at a first speed, and causes the display range to display the second image. In response to a request to terminate the change of the display range, the information processing apparatus changes the display range at a deceleration speed, and causes the display range to display the third image.

21 Claims, 11 Drawing Sheets

(56) References Cited

FOREIGN PATENT DOCUMENTS

| | | |
|---|---|---|
| JP | 10-161628 | 6/1998 |
| JP | 2001-021373 | 1/2001 |
| JP | 2001-291092 | 10/2001 |
| JP | 2002-213989 | 7/2002 |
| JP | 2004-053498 | 2/2004 |
| JP | 2007-017930 | 1/2007 |
| JP | 2008-129036 | 6/2008 |
| JP | 2009-230328 | 10/2008 |
| JP | 2009-157286 | 7/2009 |
| JP | 2011-517357 | 6/2011 |
| WO | 2006/0203305 | 2/2006 |
| WO | 2009/111329 | 9/2009 |
| WO | 2009/111329 A2 | 9/2009 |

OTHER PUBLICATIONS

Content Based Automatic Zooming: Viewing Documents on Small Displays, Patrick Chiu et al., MM'08-Proceedings of the 2008 ACM International Conference on Multimedia, with Co-Located Symposium and Workshops, 2008, pp. 817-820, XP00262747, DO : 10.1145/1459359.1459495.*

European Search Report for Application No. 10014914.5-2218 dated Jun. 14, 2011.

Content-Aware Scrolling, Edward W. Ishak et al., UIST 2006: Proceedings of the 19th Annual ACM Symposium on User Interface Software and Technology, 2008, Oct. 15, 2006, pp. 155-158, XP002627246, Association for Computing Machinery, US DOI: 10.1145/1166253.1166277, the whole document.

Content Based Automatic Zooming: Viewing Documents on Small Displays, Patrick Chiu et al., MM'08-Proceedings of the 2008 ACM International Conference on Multimedia, with Co-Located Symposium and Workshops, 2008, pp. 817-820, XP00262747, DOI: 10.1145/1459359.1459495, the whole document.

The Virtual Microscope, Renato Ferreira et al., AMIA Annual Symposium, A Conference of the American Medical Informatics Association Proceedings, Oct. 25, 1997, pp. 449-453, XP002246194, the whole document.

Japanese Office Action issued Mar. 4, 2014 for corresponding Japanese Appln. No. 2009-272813.

Chinese Office Action issued May 19, 2014, for corresponding Chinese Appln. No. 201010557261.5.

* cited by examiner

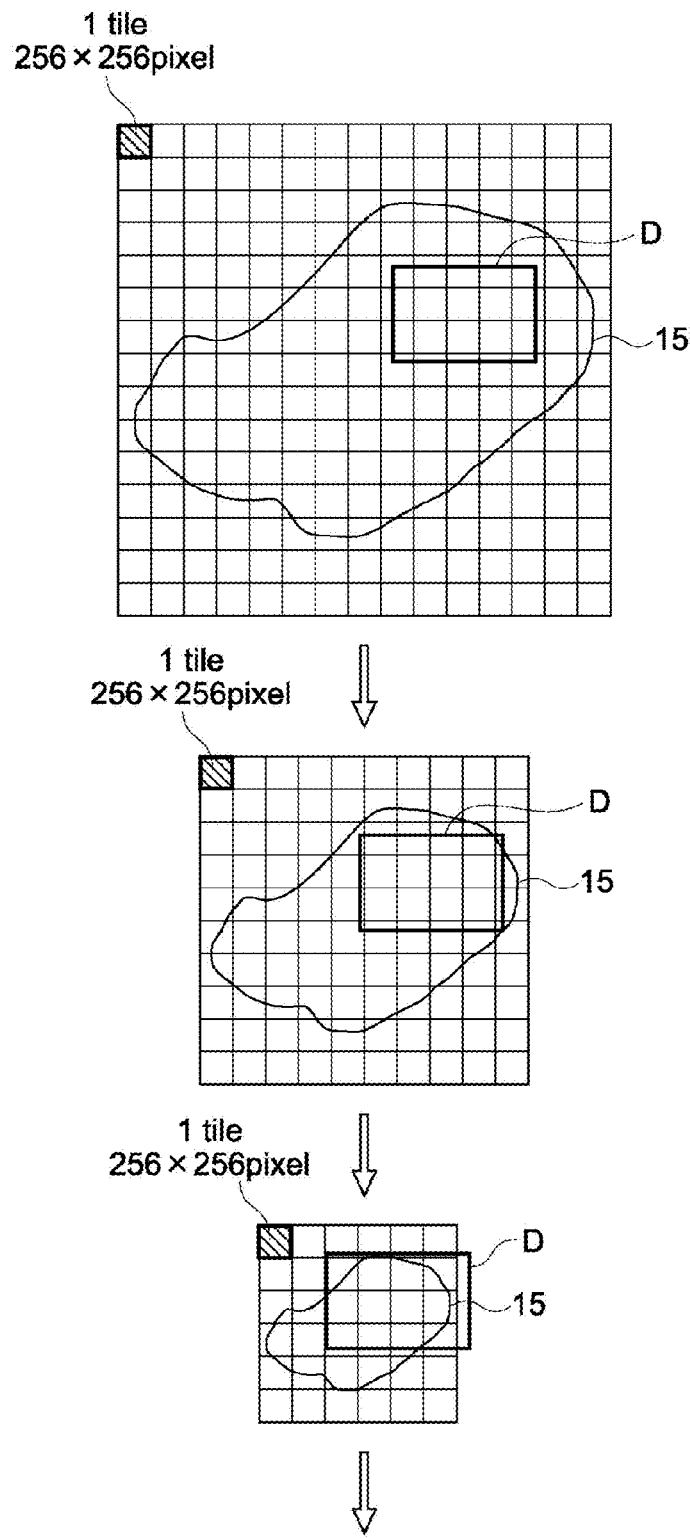

FIG.9A DCT coefficient matrix

FIG.9B Existence frequency matrix

INFORMATION PROCESSING APPARATUS, METHOD AND COMPUTER-READABLE MEDIUM

CROSS REFERENCES TO RELATED APPLICATIONS

The present application claims priority to Japanese Patent Application No. JP 2009-272813, filed in the Japanese Patent Office on Nov. 30, 2009, the entire contents of which is being incorporated herein by reference.

BACKGROUND

In a field of medicine, pathology, or the like, there has been proposed a system that digitizes an image of a cell, a tissue, an organ, or the like of a living body, that is obtained by an optical microscope, to examine the tissue or the like by a doctor or a pathologist or diagnose a patient based on the digitized image.

For example, Japanese Patent Application Laid-open No. 2009-37250 (hereinafter, referred to as Patent Document 1) discloses a method in which an image optically obtained by a microscope is digitized by a video camera with a CCD (charge coupled device), a digital signal is input to a control computer system, and the image is visualized on a monitor. A pathologist performs examination while watching the image displayed on the monitor (see, for example, paragraphs [0027] and [0028] and FIG. 5 of Patent Document 1). Generally, such a system is called a virtual microscope.

Incidentally, in the case of the past virtual microscope disclosed in Patent Document 1, for moving a display range of an image or zooming an image by a user, a user has to repeatedly perform operations of dragging a mouse or rotating a scroll wheel thereof, for example. However, an image used in the virtual microscope has a large size of 50×50 (Kpixel: kilopixel), for example. For this reason, to thoroughly observe such an image is a very hard task for a user. In particular, a pathologist performs such a task all day long. If the operations are troublesome, they may be stressful. There is fear that a change in pathological tissue that should be found may be missed, which may cause a misdiagnosis.

In view of the above-mentioned circumstances, it is desirable to provide an information processing apparatus, an information processing method, and a program therefor capable of reducing user's operations necessary for moving a display range of an image in a virtual microscope and make an observation task efficient.

SUMMARY

The present disclosure relates to an information processing apparatus, a method, and a computer-readable medium for controlling display of an image obtained by a microscope in a field of medicine, pathology, biology, materials science, or the like.

In one example embodiment, an information processing apparatus includes a processor, and a memory device operatively coupled to the processor, the memory device storing instructions that cause the processor, in cooperation with the memory device, to: (a) cause a display device to display a first image in a display range, the first image being from images associated with an observation target object (e.g., a section of biological tissue), the images including a first image, a second image, and a third image; (b) in response to a request to change the display range: (i) change the display range at a first speed; and (ii) cause the display range to display the second image; and (c) in response to a request to terminate the change of the display range: (i) change the display range at a deceleration speed; and (ii) cause the display range to display the third image.

In one example embodiment, the second image is different from the first image, and the third image is different from the first image.

In one example embodiment, the images associated with the observation target object are observed by a microscope.

In one example embodiment, the images include a fourth image associated with the observation target object. In this embodiment, the instructions cause the processor to, in response to the request to change being terminated, after the display range displays the third image, cause the display range to display the fourth image.

In one example embodiment, the information processing apparatus includes an input device which is operatively coupled to the processor. In this embodiment, the instructions cause the processor to operate with the input device to enable a user to request the change of the display range using a dragging operation.

In one example embodiment, the information processing apparatus includes an input device having a button operatively coupled to the processor. In this embodiment, the instructions cause the processor to operate with the input device to enable a user to request the termination of the change of the display range by releasing the button.

In one example embodiment, the instructions cause the processor to, using at least one of the first speed and the deceleration speed, determine which of the images are to be displayed.

In one example embodiment, the images include a feature part. In one example embodiment, the instructions cause the processor to, when the display range is being changed at the decelerated speed, determine whether the display range reaches the feature part. In one example embodiment, the instructions cause the processor to, in response to the display range reaching the feature part, increase the deceleration speed.

In one example embodiment, the images include frequency components. In this embodiment, the instructions cause the processor to: (a) generate feature data by measuring the frequency components, the frequency data indicating a frequency level; and (b) using the frequency level, determine the deceleration speed.

In one example embodiment, the information processing apparatus includes an input device. In one example embodiment, the instructions cause the processor to operate with input device to, when the display range is being changed at the decelerated speed, enable a user to instantaneously stop the movement of the display range. In one example embodiment, the instructions cause the processor to operate with input device to, when the display range is being changed at the decelerated speed, enable a user to, using a pressure applied to the input device, cause the movement of the display range to stop.

In one example embodiment, the first image is generated at a first resolution, the second image is generated at a second resolution, and the third image is generated at a third resolution. In one example embodiment, the images include a fourth image associated with the observation target object. In one example embodiment, the instructions cause the processor to, in response to the request to change being terminated, after the display range displays the third image, cause the display range to display the fourth image.

In one example embodiment, the instructions cause the processor to operate with the input device to enable a user to request the change of the display range using a zoom operation.

In one example embodiment, the displayed first image has a first area, and the displayed second image a second area, the second area being narrower than the first area.

In one example embodiment, a method of operating an information processing apparatus including instructions includes: (a) causing a display device to display a first image in a display range, the first image being from images associated with an observation target object, the images including a first image, a second image, and a third image; (b) in response to a request to change the display range: (i) causing a processor to execute the instructions to change the display range at a first speed; and (ii) causing the display range to display the second image; and (c) in response to a request to terminate the change of the display range: (i) causing a processor to execute the instructions to change the display range at a deceleration speed; and (ii) causing the display range to display the third image.

In one example embodiment, a computer-readable medium stores instructions structured to cause an information processing apparatus to: (a) cause a display device to display a first image in a display range, the first image being from images associated with an observation target object, the images including a first image, a second image, and a third image; (b) in response to a request to change the display range: (i) change the display range at a first speed; and (ii) cause the display range to display the second image; and (c) in response to a request to terminate the change of the display range: (i) change the display range at a deceleration speed; and (ii) cause the display range to display the third image.

As described above, according to the embodiments of the present disclosure, it is possible to reduce the user's operation necessary for the movement of the display range of the image in the virtual microscope, which can make the observation task efficient.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

DETAILED DESCRIPTION

Hereinafter, embodiments of the present disclosure will be described with reference to the drawings.

[Structure of Information Processing Apparatus]

Figure 1:
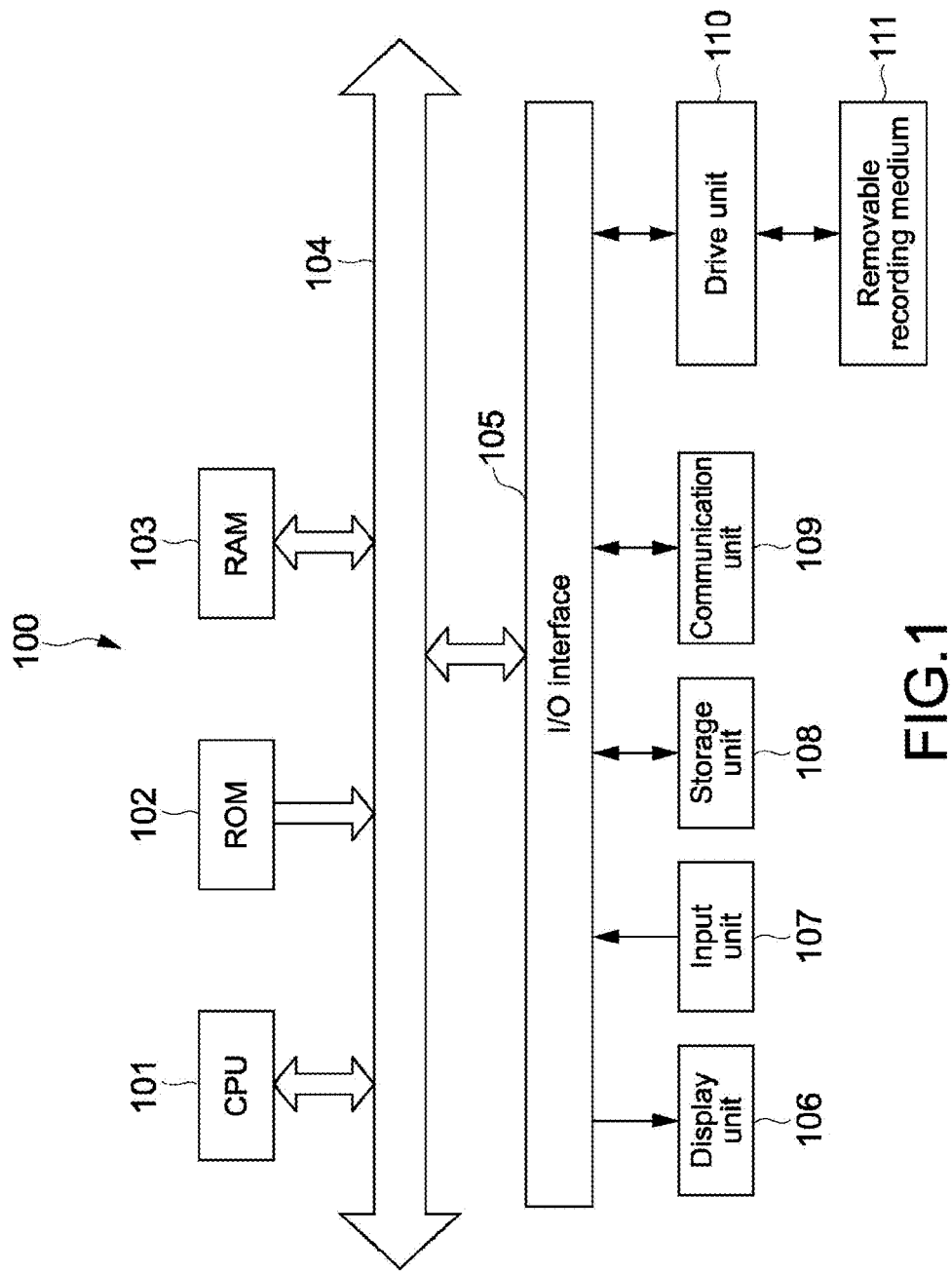
FIG. 1 is a block diagram showing the structure of an example information processing system including an information processing apparatus according to an example embodiment of the present disclosure.

FIG. 1 is a block diagram showing the structure of an example information processing system including an information processing apparatus according to an example embodiment of the present disclosure. In one example embodiment, the information processing apparatus includes a PC (personal computer) 100.

The PC 100 includes a CPU (central processing unit) 101, a ROM (read only memory) 102, a RAM (random access memory) 103, an input and output interface (hereinafter, abbreviated as I/O interface) 105, and a bus 104 that connects those components with one another.

The CPU 101 accesses the RAM 103 or the like when necessary and performs overall control on blocks of the PC 100 while performing various computation processing. The ROM 102 is a non-volatile memory in which OS executed by the CPU 101, a program, or a firmware such as various parameters is fixedly stored. The RAM 13 is used as a work area or the like for the CPU 101, and temporarily holds the OS, various running programs, or various data items during processing.

To the I/O interface 105, a display unit 106, an input unit 107, a storage unit 108, a communication unit 109, a drive unit 110, and the like are connected.

The display unit 106 is a display device that uses liquid crystal, EL (electro-luminescence), a CRT (cathode ray tube), or the like. The display unit 106 may be incorporated in the PC 100 or may be externally connected to the PC 100.

The input unit 107 is, for example, a pointing device, a keyboard, a touch panel, or another operation apparatus. In the case where the input unit 107 includes a touch panel, the touch panel may be integrated with the display unit 106.

The storage unit 108 is a non-volatile memory such as an HDD (hard disk drive), a flash memory, and another solid-state memory. In the storage unit 108, an image obtained by an optical microscope (described later) is stored.

The drive unit 110 is a device capable of driving a removable recording medium 111 such as an optical recording medium, a floppy (registered trademark) disk, a magnetic recording tape, and a flash memory. In contrast, the storage unit 108 is often used as a device that is previously included in the PC 100 and mainly drives a recording medium that is not removable.

The communication unit 109 is a modem, a router, or another communication apparatus that is connectable to a LAN (local area network), a WAN (wide area network), or the like and is used for communicating with another device. The communication unit 109 may perform either one of a wired communication or a wireless communication. The communication unit 109 is used separately from the PC 100 in many cases.

Figure 2:
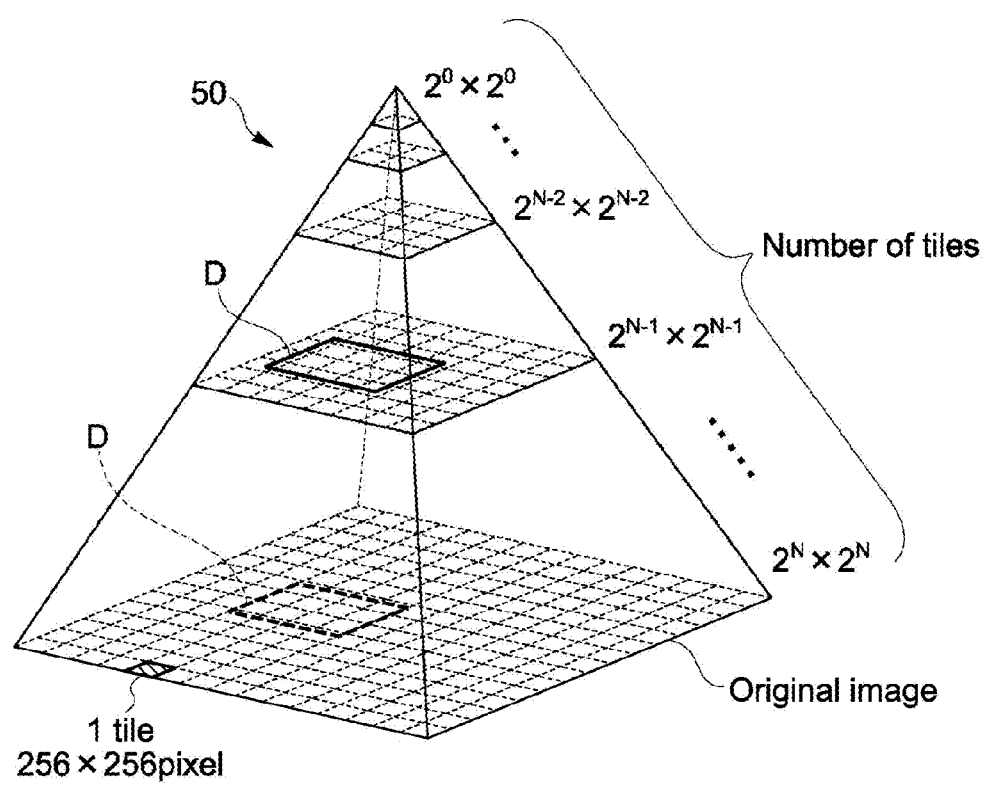
FIG. 2 is a diagram showing an example image pyramid structure for explaining a display principle according to an example embodiment of the present disclosure.

Next, a description will be given on an image that is obtained by an optical microscope (not shown) and on a principle of displaying the image. The image is mainly stored in the storage unit 108 of the PC 100. FIG. 2 is a diagram showing an example image structure for explaining the display principle.

As shown in FIG. 2, the image used in this embodiment has a pyramid structure (image pyramid structure 50). The image pyramid structure 50 is an image group generated at a plurality of resolutions with respect to one image obtained from one observation target object 15 (see, FIG. 3) by the optical microscope. In this embodiment, images that constitute the image group are each referred to as an entire image. On a lowermost part of the image pyramid structure 50, a largest image is disposed, and on an uppermost part thereof, a smallest image is disposed. A resolution of the largest image is 50×50 (Kpixel) or 40×60 (Kpixel), for example. A resolution of the smallest image is 256×256 (pixel) or 256×512 (pixel), for example. Further, the entire images are images compressed by JPEG compression, for example, but the compression system is not limited to this.

The PC 100 extracts, from the entire images included in the image pyramid structure 50, an image of a part (hereinafter, referred to as partial image) corresponding to a predetermined display range of the display unit 106 as appropriate, and reads out the partial image on the RAM 103, to be output by the display unit 106. Here, in FIG. 2, the display range of the display unit 106 is represented by D.

Figure 3:
FIG. 3 is a diagram for explaining a procedure at a time when an image group of the image pyramid structure shown in FIG. 2 is generated.

FIG. 3 is a diagram for explaining an example procedure of generating the image group of the image pyramid structure 50.

First, a digital image of an original image obtained at a predetermined observation magnification by an optical microscope (not shown) is prepared. The original image corresponds to the largest image that is the lowermost image of the image pyramid structure 50 shown in FIG. 2, that is, the entire image at a highest resolution. Therefore, as the lowermost entire image of the image pyramid structure 50, an image obtained by the observation at a relatively high magnification by the optical microscope is used.

It should be noted that in the field of pathology, generally, a matter obtained by slicing an organ, a tissue, or a cell of a living body, or a part thereof is an observation target object 15. Then, a scanner apparatus (not shown) having a function of the optical microscope reads the observation target object 15 stored on a glass slide, to obtain a digital image and store the digital image obtained into the scanner apparatus or another storage apparatus.

As shown in FIG. 3, the scanner apparatus or a general-purpose computer (not shown) generates, from the largest image obtained as described above, a plurality of entire images whose resolutions are reduced stepwise, and stores those entire images in unit of "tile" that is a unit of a predetermined size, for example. The size of one tile is 256×256 (pixel), for example. The image group generated as described above forms the image pyramid structure 50, and the storage unit 108 of the PC 100 stores the image pyramid structure 50. Actually, the PC 100 only has to store the entire images whose resolutions are different with the entire images being associated with resolution information items, respectively. In addition, the generating and storing of the image pyramid structure 50 may be performed by the PC 100 shown in FIG. 1.

The PC 100 uses software that employs the system of the image pyramid structure 50, to extract a partial image corresponding to the display range D from the entire image at an arbitrary resolution of the image pyramid structure 50 in accordance with an input operation by a user through the input unit 107. Then, the PC 100 reads the partial image on the RAM 103, and subsequently output the partial image on the display unit 106. In addition, in the case where a movement operation is input by the user, with respect to the partial image displayed, the PC 100 moves the display range D on the entire image from which the partial image is extracted, and extracts the partial image included in the display range D after being moved, to be output. Further, in the case where the user inputs a zoom operation with respect to the partial image displayed, the PC 100 extracts, from the entire image whose resolution is different from the entire image from which the partial image concerned is extracted, a partial image corresponding to a wide-area image or a narrow-area image of the partial image, to be output. Through such a processing, the user can get a feeling of observing the observation target object 15 while changing the observation magnification. That is, the PC 100 functions as a virtual microscope. A virtual observation magnification in this case corresponds to a resolution in reality.

Here, the display range D does not refer to the maximum display range size of the display unit 106, but refers to a range of the whole or a part of the display range of the display unit 106, which can be set by the user as appropriate, for example. Further, the display range D corresponds to an area in which the tiles are placed in multiple rows and multiple columns.

[Operation of Information Processing Apparatus]

Next, the operation of the PC 100 structured as described above will be described.

Figure 4:
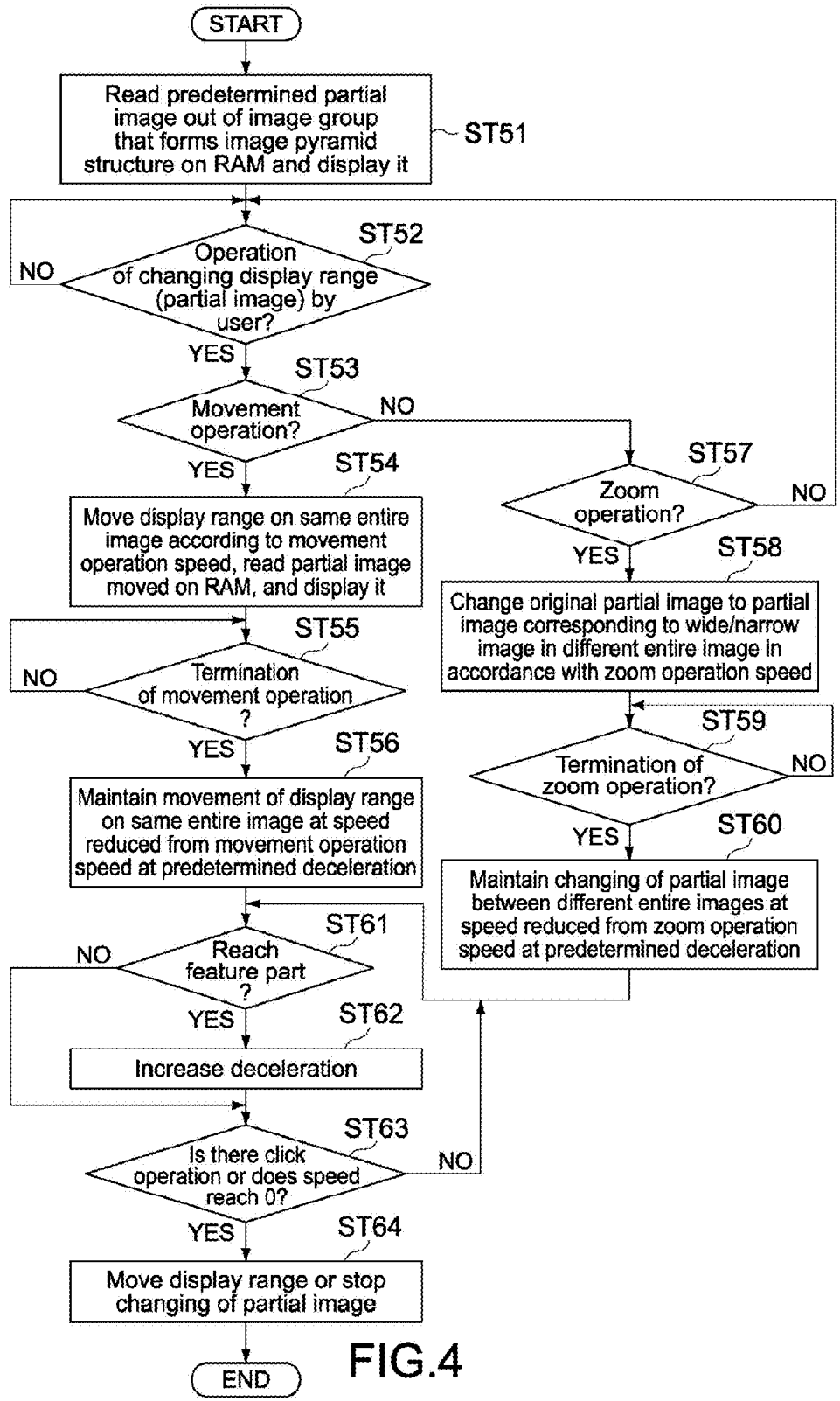
FIG. 4 is a flowchart showing an example operation of a PC according to an example embodiment of the present disclosure.
Figure 5:
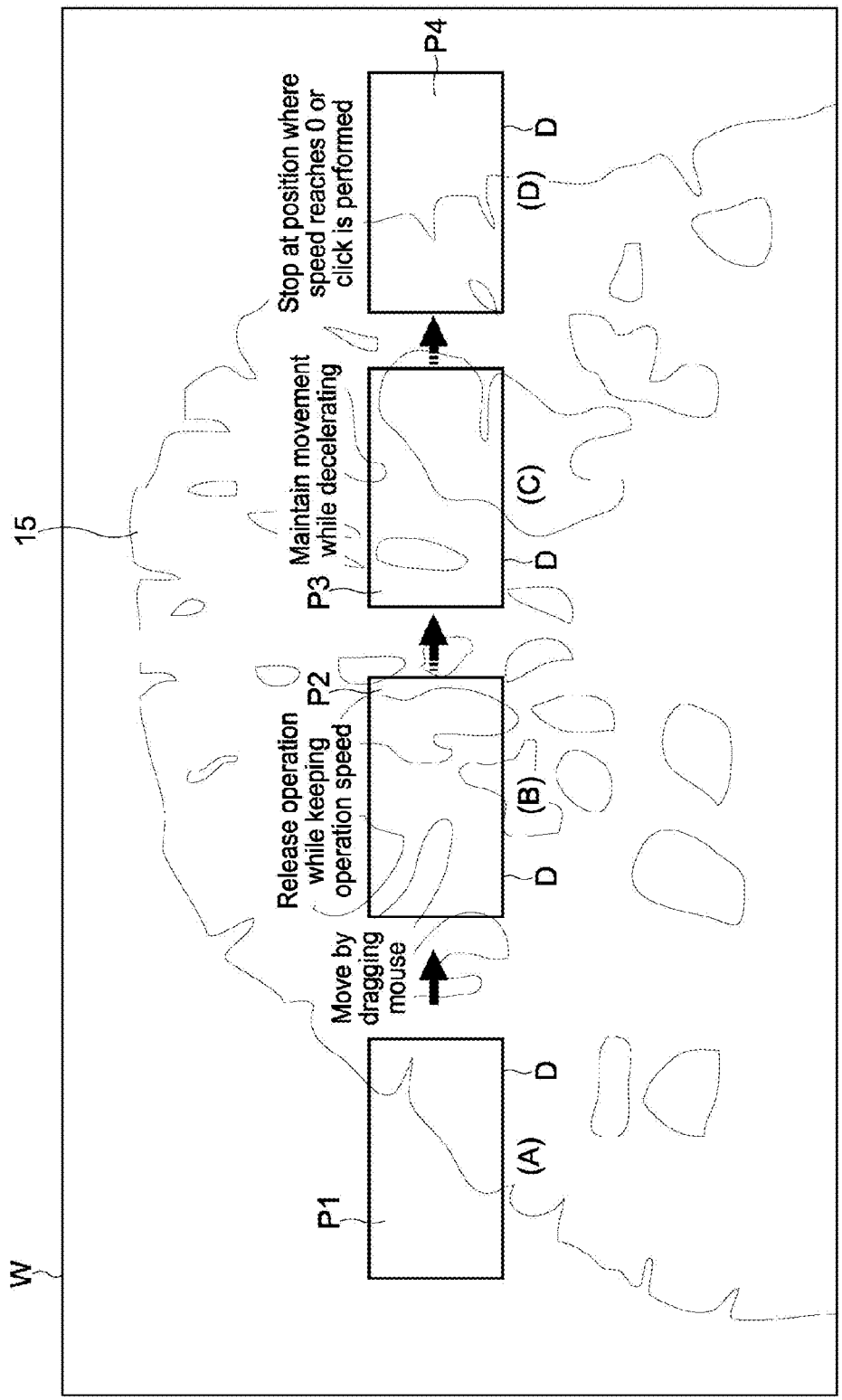
FIG. 5 is a diagram showing an example operation at a time of a movement operation on a display range, out of the operation of the PC according to an example embodiment of the present disclosure.

FIG. 4 is a flowchart showing an example operation of the PC 100 according to an example embodiment. FIG. 5 is a diagram showing an example operation at the time when the movement operation of the display range D out of the operation of the PC 100 is performed. FIGS. 6A, 6B, 6C and 6D are diagrams each showing an operation at the time when the zoom operation of the display range D, which is included in the operation of the PC 100, is performed.

Software stored in the storage unit 108, the ROM 102, or the like and a hardware resource of the PC 100 are cooperated with each other, thereby implementing the following processing of the PC 100. Specifically, the CPU 101 loads a program that forms the software stored in the storage unit 108, the ROM 102, or the like and executes the program, thereby implementing the following processing.

First, the user accesses a file including the image group of the image pyramid structure 50 through an input operation using the input unit 107. In response to this, the CPU 101 of the PC 100 extracts a predetermined partial image from the image pyramid structure 50 stored in the storage unit 108 and reads the predetermined partial image on the RAM 103, to be displayed on the display unit 106 (Step 51). The predetermined partial image that is included in the image pyramid structure 50 and accessed by the CPU 101 first may be set by default or by the user as appropriate.

Typically, the CPU 101 first displays a partial image in the entire image, which has a resolution corresponding to an observation magnification of a relatively low resolution (low magnification), e.g., 1.25 times.

Subsequently, the CPU 101 waits for an input operation from the input unit 107 by the user (Step 52).

When the user operates the input unit 107 to shift the display range D to a desired position (YES in Step 52), the CPU 101 judges whether the operation is a movement operation or not (Step 53). Typically, the movement operation is a dragging operation using a mouse.

In the case where the operation by the user is the movement operation (YES in Step 53), the CPU 101 moves the display range D on the entire image from which the partial image is extracted in accordance with the speed of the movement operation (at the same speed as the movement operation speed), and reads the partial image of a part where the display range D after being moved is disposed on the RAM 103, to be displayed (Step 54).

Subsequently, the CPU 101 judges whether the movement operation (dragging operation) is terminated or not, that is, the user releases a mouse button (Step 55).

In the case where it is judged that the movement operation is terminated (YES in Step 55), the CPU 101 further moves the display range D on the entire image at a speed reduced from the movement operation speed mentioned above at a predetermined deceleration (Step 56). That is, the CPU 101 maintains the movement of the display range D while reducing the speed.

The movement speed (V) in this case is updated for each display range D according to the following equation:

$$V = V * S \quad (0 < S < 1.0) \tag{1}$$

in which S represents deceleration.

In the example of FIG. 5, first, the mouse is dragged rightward, thereby moving the display range D rightward. As a result, a partial image P1 is updated to a partial image P2 disposed on the right hand of the partial image P1 ((A) and (B) in FIG. 5). Then, even when the dragging operation is terminated, the movement of the display range D is continued while being decelerated ((B) and (C) in FIG. 5). Thus, even after the dragging operation is terminated, the user can visually feel as if the display range D is continuously moved by an inertial force.

In the case of the movement of the display range D while being decelerated as described above, the CPU 101 can calculate a partial image that is expected to be necessary and time when the partial image becomes necessary, on the basis of the movement speed (V) and the movement direction. Therefore, prior to the movement of the display range D, the CPU 101 can load at least a part of the partial image corresponding to a position to which the display range D is moved, that is, the tile from the image pyramid structure 50 to the RAM 103. Thus, the movement of the display range D is smoothly performed.

Returning the flowchart of FIG. 4, in the case where it is judged that the user operation is not the movement operation in Step 53, the CPU 101 judges whether the user operation is the zoom operation or not (Step 57). Typically, the zoom operation is a rotating operation of a scroll wheel of a mouse.

In the case where it is judged that the operation is the zoom operation (YES in Step 57), the CPU 101 changes, at the same speed as the speed of the zoom operation, an original partial image that is already displayed into a partial image corresponding to a wide-area image or narrow-area image of the original partial image in an entire image different from the original image from which the original partial image is extracted (Step 58).

Figure 6A:
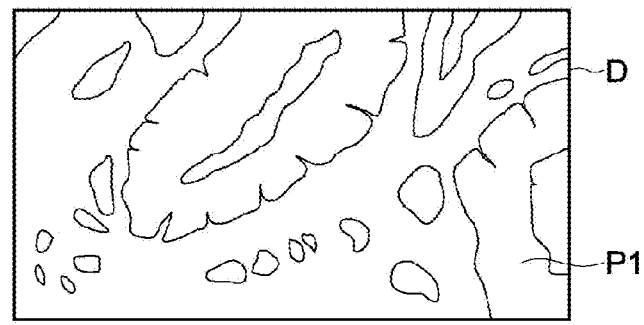
FIGS. 6A, 6B, 6C and 6D are diagrams each showing an operation at a time of a movement operation on a display range, out of the operation of the PC according to an example embodiment of the present disclosure.
Figure 6B:
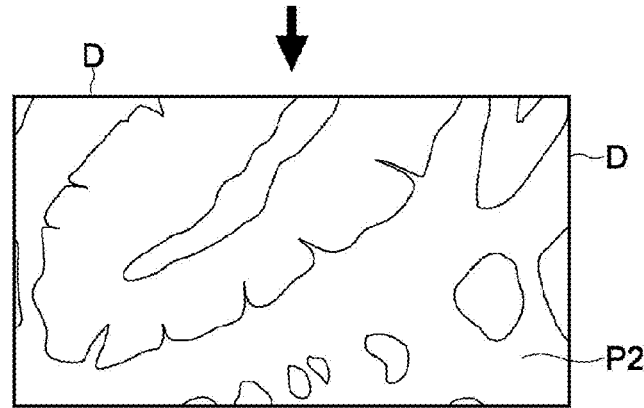
Figure 6C:
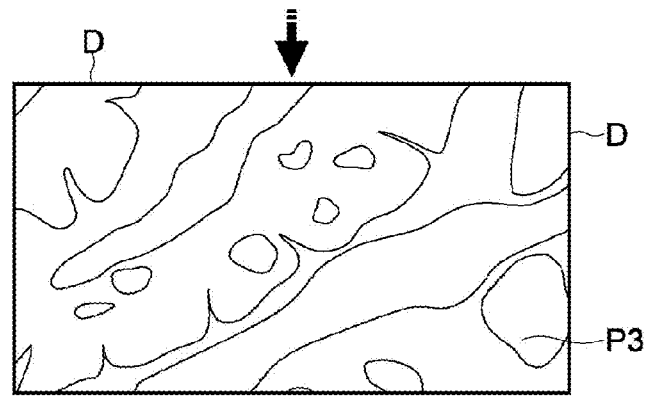

For example, as shown in FIGS. 6A and 6B, in the case where the zoom-in operation is input for the partial image P1, the CPU 101 extracts, from the image pyramid structure 50, the partial image P2 corresponding to the narrow-area image of the partial image P1 in an entire image at a resolution different from that of the entire image from which the partial image P1 is extracted, and changes the partial image P1 into the partial image P2.

Subsequently, the CPU 101 judges whether the zoom operation (wheel rotation operation) is terminated or not, that is, the user releases the scroll wheel of the mouse or not (Step 59).

In the case where it is judged that the zoom operation is terminated (YES in Step 59), the CPU maintains the changing of the partial image between the different entire images at a speed reduced from the zoom operation speed at a predetermined deceleration (Step 60). The zoom speed decelerated in this case is calculated in the same way as the equation (1) relating to the movement speed (V).

In the example of FIG. 6, when the user rotates the scroll wheel of the mouse outwardly, the original partial image P1 in the display range D is changed to the partial image P2 of a narrower area in the different entire image at the rotation speed (FIGS. 6A and 6B). Then, even when the scroll-wheel rotation operation is terminated, the changing of the partial images (from P2 to P3) between the different entire images is continued while being decelerated (FIGS. 6B and 6C). Thus, even after the zoom operation is terminated, the user can visually feel as if the zoom operation is continued by an inertial force.

Returning to the flowchart of FIG. 4, the CPU 101 judges whether to reach a feature part in the entire image or not during a time period when the display range D is moved while being decelerated after the movement operation or during a time period when the partial image is changed while being decelerated after the zoom operation (Step 61).

Figure 7A:
FIG. 7A and 7B are diagrams each showing a state of feature analysis of an entire image in the embodiment of the present disclosure.
Figure 7B:
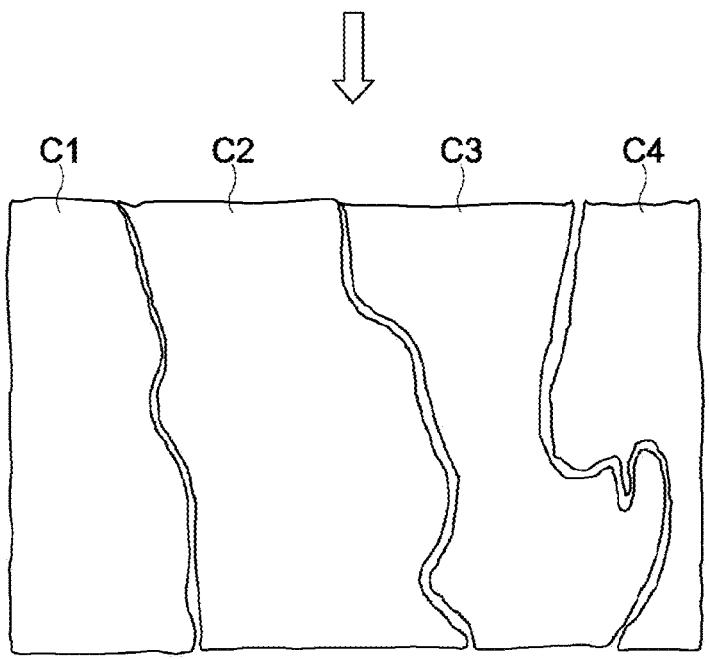

Here, the feature part refers to a part in which an image component is drastically changed in the entire image, for example. The feature part is detected by analyzing the entire image at a predetermined analysis method. FIG. 7A and 7B are diagrams each showing a state where the entire image concerned is subjected to feature analysis.

As shown in FIG. 7A and 7B, an entire image W is divided into a plurality of cluster regions (C1 to C4) by a clustering process, for example. Data relating to boundary lines of the plurality of cluster regions is stored in the storage unit 108 as feature data, and CPU 101 reads the feature data into the RAM 103 for the movement operation and the zoom operation.

Figure 8:
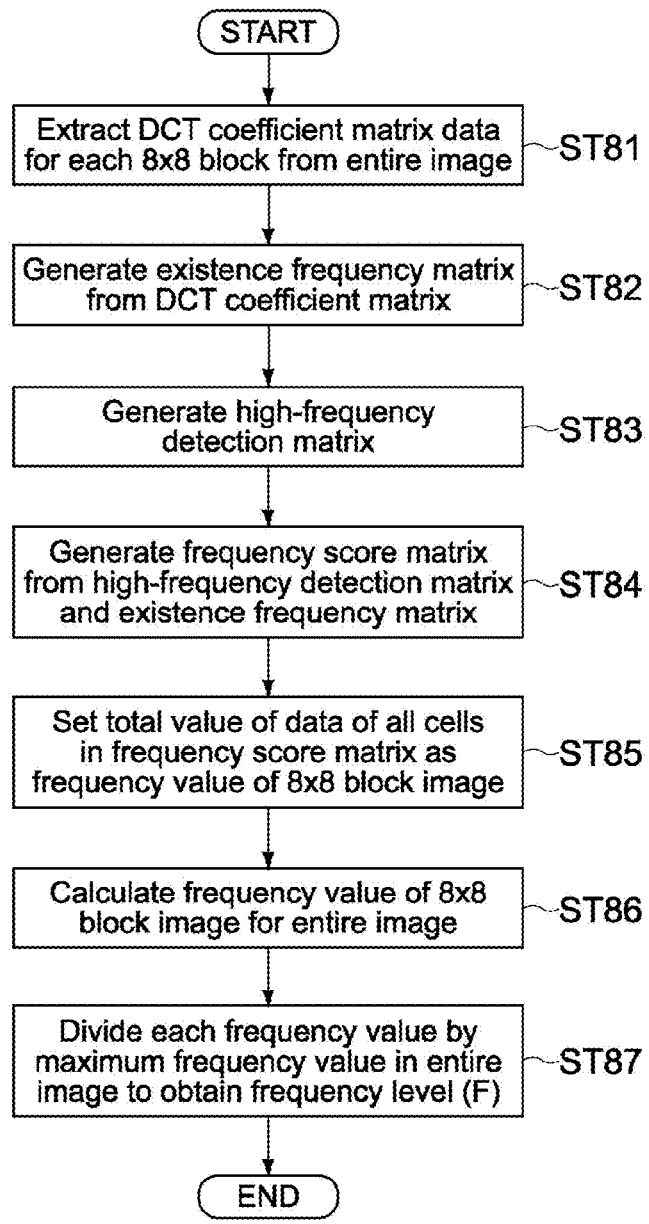
FIG. 8 is a flowchart showing an example calculation process of a frequency level in parts of the entire image in an example embodiment of the present disclosure.

The generation of feature data may not necessarily require the dividing process into the cluster regions by the clustering process. For example, the CPU 101 can also generate the feature data by measuring frequency components in the entire image. FIG. 8 is a flowchart showing a generation process of the feature data by the measurement of the frequency components. Further, FIGS. 9 and 10 are diagrams showing a part of the measurement process of the frequency components.

For the measurement of the frequency components, a DCT coefficient in performing JPEG compression on the entire images is used, for example. That is, as shown in FIG. 8, the CPU 101 first extracts, from the entire image, DCT coefficient matrix data for each block of 8×8 (Step 81). Based on the DCT coefficient matrix, an amount of high-frequency components for each 8×8 block is revealed.

Figure 9:
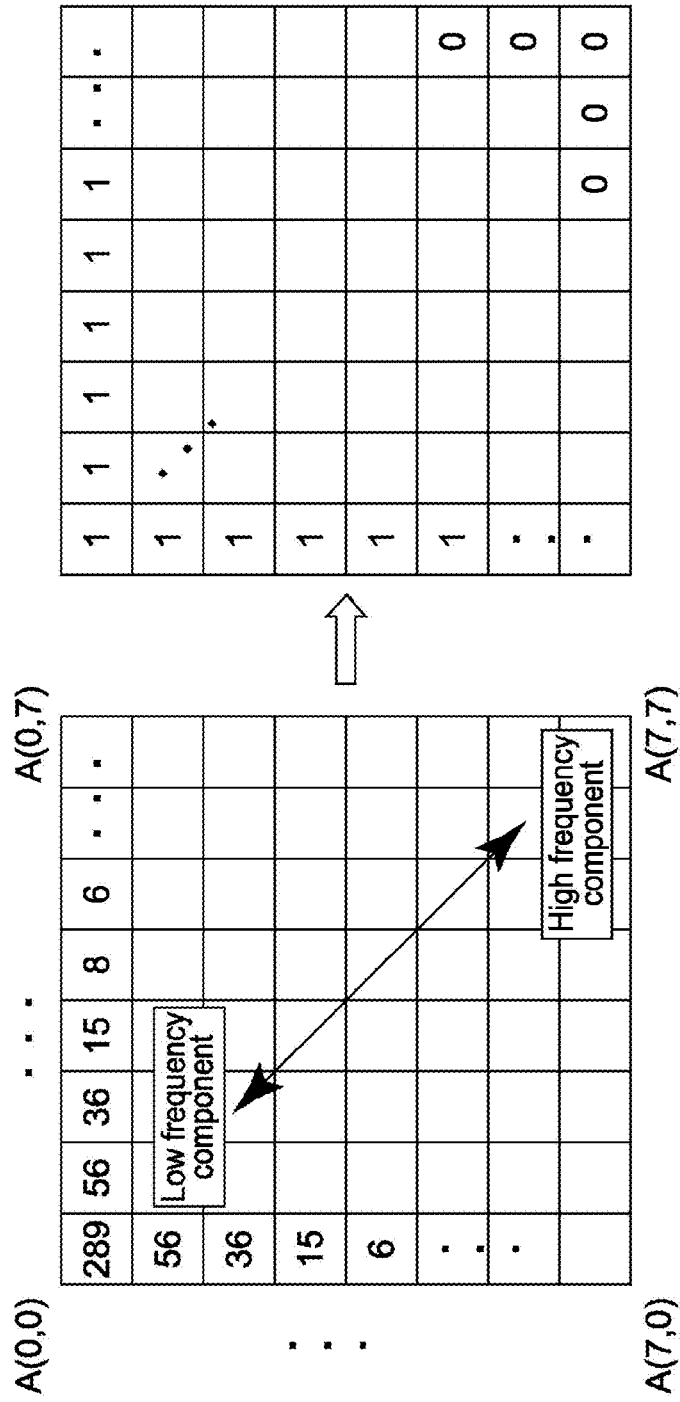
FIGS. 9A and 9B are diagrams each schematically showing an example generation process of an existence frequency matrix from a DCT coefficient matrix of the entire image by the PC in an example embodiment of the present disclosure.

Subsequently, the CPU 101 generates a matrix (existence frequency matrix) obtained by changing, to 1, a numerical value of a cell whose numerical value is not 0 in the DCT coefficient matrix, as shown in FIG. 9 (Step 82). Further, the CPU 101 generates a matrix (high frequency detection matrix) in which the numerical values become larger as the higher-frequency components are obtained (toward the lower right corner of the matrix) (Step 83).

Figure 10:
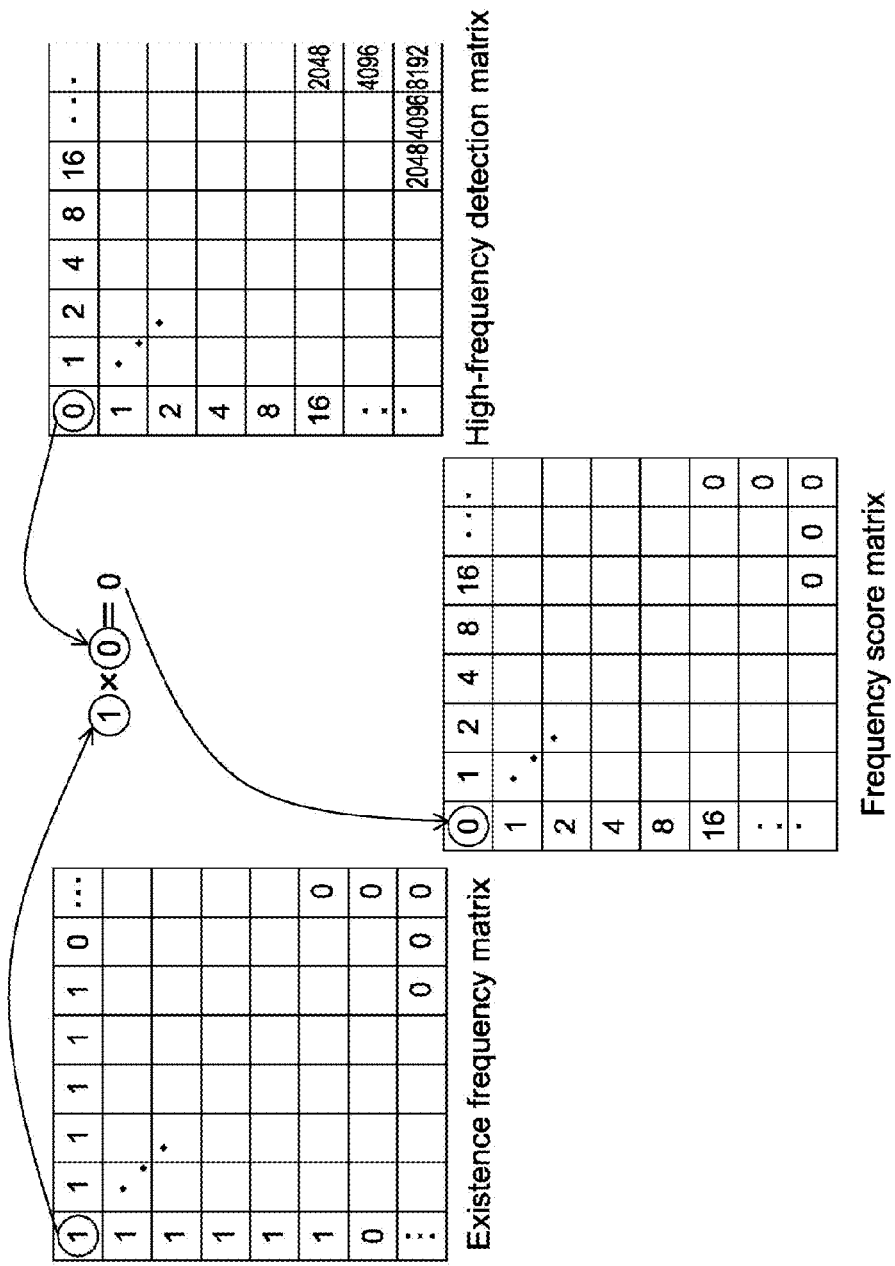
FIG. 10 is a diagram schematically showing an example generation process of a frequency score matrix from the existence frequency matrix and a high-frequency detection matrix by the PC in an example embodiment of the present disclosure.

Subsequently, as shown in FIG. 10, the CPU 101 multiplies the numerical values of corresponding cells of the existence frequency matrix and the high frequency detection matrix, thereby generating a new matrix (frequency score matrix) (Step 84).

Subsequently, the CPU 101 adds the pieces of data of all the cells of the frequency score matrix to obtain a total value, and set the total value as a frequency value of an 8×8 block image (Step 85).

Then, the CPU 101 calculates the frequency value of each of the 8×8 block images with respect to the whole of the entire images (Step 86). Further, the CPU 101 divides the frequency value of each of the 8×8 block images by the maximum value of each of the 8×8 block images in the entire images, thereby calculating a frequency level (F) that is normalized for each of the 8×8 block images (Step 87).

Here, data obtained by quantizing the DCT coefficient may be used instead of the DCT coefficient matrix.

The CPU 101 stores, as the feature data, the frequency level (F) for each 8×8 block image of the entire image into the RAM 103.

Returning to the flowchart of FIG. 4, in the case where it is judged that the display range D reaches the feature part in the entire image (YES in Step 61), that is, it is judged that the frequency level (F) in the entire image is changed, the CPU 101 increases the deceleration in accordance with the frequency level (F) (Step 62). Specifically, the CPU 101 calculates the deceleration (S) based on the following equation, to display the partial image in accordance therewith.

$$S=1.0-F \qquad (2)$$

With the process described above, the movement or the zoom in an area that the user is less interested in is performed quickly, while the movement or the zoom in an area that is important for the user is performed carefully (slowly). For example, physically, a friction coefficient differs depending on the areas of the entire image, and such a display effect that a brake is further applied on a part where the image is changed is obtained. As a result, the user is prevented from missing a specific part as much as possible.

Through the processes described above, the CPU 101 judges whether the user inputs the click operation during the zoom or the movement decelerated of the display range D or whether the speed reaches 0 or not due to the deceleration (Step 63).

Figure 6D:
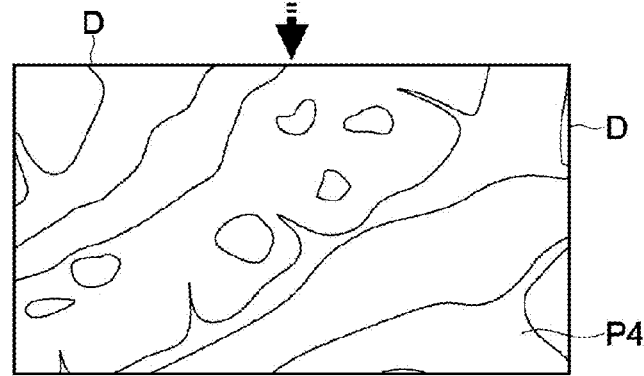

In the case where the click operation is input or the speed reaches 0 (YES in Step 63), the CPU 101 stops the movement of the display range D that has been subjected to the movement operation or the changing of the partial image after the zoom operation (Step 64, (D) in FIG. 5 and FIG. 6D). The click operation by the user stops the changing of the partial image or the movement of the display range D, with the result that the user can be prevented from missing a timing at which the partial image during the movement or the zoom due to the pseudo inertial force reaches an interesting part.

Through the processes described above, even after the movement operation or the zoom operation is not input by the user, the PC 100 can give such a visual effect that the operation is maintained due to the inertial force while being decelerated. Therefore, the number of operation times in the case where the user manually performs the movement operation or the zoom operation is reduced to a great extent. In particular, the efficiency of the operation by a pathologist for a pathological diagnosis is increased, with the result that the missing of a serious part is significantly reduced. In addition, the deceleration is increased in a specific part (high-frequency component), which further prevents the missing of the part.

MODIFIED EXAMPLE

The present disclosure is not limited to the above embodiment, and can be variously modified without departing from the gist of the present disclosure.

In the above embodiment, in the case where the user inputs the click operation of the mouse during the zoom or the movement decelerated, the CPU 101 instantaneously stops the movement of the display range D after being moved or the changing of the partial image after the zoom operation. However, the manner of the stop is not limited to this. For example, in the case where the user inputs the click operation after the zoom operation or the movement operation by the user is terminated (after the user releases the button), the CPU 101 may change the deceleration in accordance with a pressure applied to the mouse by the click.

Figure 11:
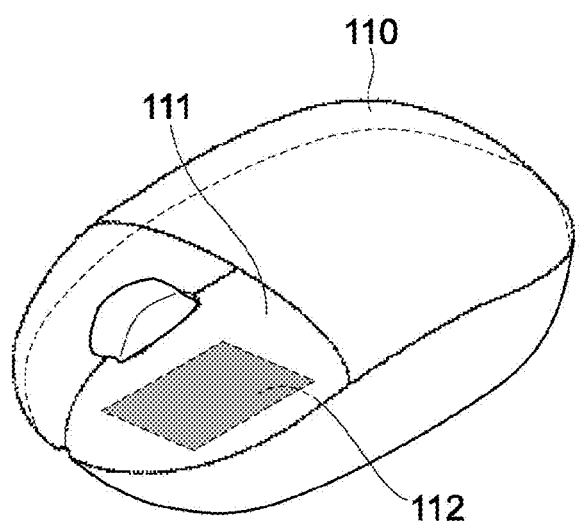
FIG. 11 is a diagram showing the appearance and the inner structure of an example mouse used in another embodiment of the present disclosure.

Specifically, as shown in FIG. 11, for example, in a left button 111 of a mouse 110 serving as the input unit 107, a pressure sensor such as a pressure-sensitive sheet 112 is provided. The pressure sensor detects a pressure applied by a finger of the user, for example. The pressure-sensitive sheet may be provided not in the left button 111 but on the surface thereof. For the pressure sensor, any pressure-sensitive element of a semiconductor diaphragm type, a capacitance type, an elastic diaphragm type, a piezoelectric type, a vibration type, a bourdon tube type, a bellows type or the like may be used. Further, instead of the sheet shape, a three-dimensional sensor may be used.

When the user performs the click operation on the left button with the mouse during the zoom operation or the movement operation decelerated, the CPU 101 changes the predetermined deceleration on the basis of the value of the pressure applied to the left button by the click operation, that is, an analog quantity input from the pressure-sensitive sheet 112.

Typically, the CPU 101 increases the deceleration, as the pressure value detected becomes larger. That is, depending on the pressure value detected, the CPU 101 calculates a deceleration based on the following equation, to display the partial image in accordance therewith.

$$S=1.0-P \qquad (3)$$

in which P represents a value obtained by normalizing the pressure value.

As a result, by applying the pressure using the mouse 110 during a time period when the zoom or the movement is continued at a speed decelerated, the user can get such an operation feeling that a brake is applied due to a friction force in accordance with the pressure with respect to the zoom or the movement. More specifically, for example, the user can get an operation feeling as if the user stops the rotation of a rotating globe by a finger's friction force. Therefore, the user can stop the movement or the zoom with an intuitive operation feeling.

In the case where a touch panel or a touch pad is used as the input unit 107 instead of the mouse 110, the same processes are implemented by providing the pressure sensor in the touch panel or the touch pad, for example.

In the above, the description is given on the mode in which the image data that forms the image pyramid 50 is stored in the storage unit 108 of the PC 100. However, another computer separated from the PC 100 or a server may store the image data that forms the image pyramid structure 50, and the PC 100 used by the user as a terminal apparatus may access the computer or the server to receive the image data. In this case, the PC 100 as the terminal apparatus and the server or the like may be connected via a network such as a LAN and a WAN. In particular, the use of the WAN can realize telepathology, telediagnosis, or the like. In addition, the generation process of the feature data (frequency level) may be executed by the computer separated from the PC 100 or the server, and the PC 100 may receive the feature data therefrom.

In the above, the description is given on the mode in which, as the original image of the image pyramid structure 50, one original image is generated with respect to the one observation target object 15. However, with respect to the one observation target object 15, a plurality of original images may be generated in the thickness direction of the observation target object 15, which is a focus direction of the optical microscope. This is called Z-stack, which is a function to deal with the case where tissues or cells may have different shapes also in the thickness direction of the observation target object 15. A scanner apparatus has the Z-stack function in many cases, and about 5 to 10 or 10 to 30 original images are generated.

In the above embodiment, the PC 100 generates the feature data in the entire image by measuring the frequency components of the entire image. However, the PC 100 may generate the feature data by detecting a standard deviation, a contrast, an edge, or the like in the entire image, other than the frequency, or combining them.

The PC is used as the information processing apparatus according to the above embodiment, but a dedicated information processing apparatus may be used instead of the PC. Further, the information processing apparatus is not limited to an apparatus that implements the above-described information processing in cooperation with the hardware resource and the software. Dedicated hardware may implement the above-described information processing.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An information processing apparatus comprising:
    a processor;
    an input device operatively coupled to the processor; and
    a memory device operatively coupled to the processor, the memory device storing instructions that cause the processor, in cooperation with the memory device, to:
    (a) cause a display device to display a first image in a display range, the first image being from images associated with an observation target object, the images including the first image, which is generated at a first resolution, a second image, which is generated at a second resolution different from the first resolution, and a third image, which is generated at a third resolution different from the first resolution and the second resolution, wherein the images are divided into a plurality of cluster regions having boundary lines;
    (b) in response to a request from the input device to change the display range using a zoom operation:
        (i) change the display range at a first speed; and
        (ii) cause the display range to display the second image at the second resolution;
    (c) in response to a request from the input device to terminate the change of the display range using the zoom operation:
        (i) change the display range at a first deceleration speed, which is slower than the first speed, and maintain movement at the first deceleration speed, based on the request from the input device to terminate the change of the display range using the zoom operation; and
        (ii) cause the display range to display the third image at the third resolution;
    (d) while changing the display range at the first deceleration speed, determine that the display range has reached a boundary line of a cluster region after the request to terminate the change of the display range using the zoom operation and before the change of the display range using the zoom operation is terminated; and
    (e) in response to the display range reaching the boundary line of the cluster region, increase deceleration such that the display range is changed at a second deceleration speed.

2. The information processing apparatus of claim 1, wherein the second image is different from the first image, and the third image is different from the first image.

3. The information processing apparatus of claim 2, wherein the observation target object includes a section of biological tissue.

4. The information processing apparatus of claim 2, wherein the images associated with the observation target object are observed by a microscope.

5. The information processing apparatus of claim 2, wherein:
    (a) the images include a fourth image associated with the observation target object; and
    (b) the instructions, when executed by the processor, cause the processor to, in response to the request to change being terminated, after the display range displays the third image, cause the display range to display the fourth image.

6. The information processing apparatus of claim 2, wherein the instructions, when executed by the processor, cause the processor to operate with the input device to enable a user to request the change of the display range using a dragging operation.

7. The information processing apparatus of claim 2, wherein the input device includes a button operatively coupled to the processor, wherein the instructions, when executed by the processor, cause the processor to operate with the input device to enable a user to request the termination of the change of the display range by releasing the button.

8. The information processing apparatus of claim 2, wherein the instructions, when executed by the processor, cause the processor to, using at least one of the first speed and the first deceleration speed, determine which of the images are to be displayed.

9. The information processing apparatus of claim 2, wherein:

(a) the images include frequency components;
(b) the instructions, when executed by the processor, cause the processor to:
(i) generate feature data by measuring the frequency components, the frequency data indicating a frequency level; and
(ii) using the frequency level, determine the first deceleration speed.

10. The information processing apparatus of claim 2, wherein the instructions, when executed by the processor, cause the processor to operate with input device to, when the display range is being changed at the first deceleration speed, enable a user to instantaneously stop the movement of the display range.

11. The information processing apparatus of claim 2, wherein the instructions, when executed by the processor, cause the processor to operate with input device to, when the display range is being changed at the first deceleration speed, enable a user to, using a pressure applied to the input device, cause the movement of the display range to stop.

12. The information processing apparatus of claim 1, wherein the observation target object includes a section of biological tissue.

13. The information processing apparatus of claim 1, wherein the images associated with the observation target object are observed by a microscope.

14. The information processing apparatus of claim 1, wherein:
(a) the images include a fourth image associated with the observation target object; and
(b) the instructions, when executed by the processor, cause the processor to, in response to the request to change being terminated, after the display range displays the third image, cause the display range to display the fourth image.

15. The information processing apparatus of claim 1, which includes an input device having a button operatively coupled to the processor, wherein the instructions, when executed by the processor, cause the processor to operate with the input device to enable a user to request the termination of the change of the display range by releasing the button.

16. The information processing apparatus of claim 1, wherein the instructions, when executed by the processor, cause the processor to determine, using at least one of the first speed and the first deceleration speed, which of the images are to be displayed.

17. The information processing apparatus of claim 1, wherein the instructions, when executed by the processor, cause the processor to operate with input device to, when the display range is being changed at the first deceleration speed, enable a user to instantaneously stop the movement of the display range.

18. The information processing apparatus of claim 1, wherein the instructions, when executed by the processor, cause the processor to operate with input device to, when the display range is being changed at the first deceleration speed, enable a user to, using a pressure applied to the input device, cause the movement of the display range to stop.

19. The information processing apparatus of claim 1, wherein the displayed first image has a first area, and the displayed second image a second area, the second area being narrower than the first area.

20. A method of operating an information processing apparatus including instructions, the method comprising:
(a) causing a display device to display a first image in a display range, the first image being from images associated with an observation target object, the images including the first image, which is generated at a first resolution, a second image, which is generated at a second resolution different from the first resolution, and a third image, which is generated at a third resolution different from the first resolution and the second resolution, wherein the images are divided into a plurality of cluster regions having boundary lines;
(b) in response to a request from an input device to change the display range using a zoom operation:
(i) causing a processor to execute the instructions to change the display range at a first speed; and
(ii) causing the display range to display the second image at the second resolution;
(c) in response to a request from an input device to terminate the change of the display range using the zoom operation:
(i) causing a processor to execute the instructions to change the display range at a first deceleration speed, which is slower than the first speed, and maintain movement at the first deceleration speed, based on the request from the input device to terminate the change of the display range using the zoom operation; and
(ii) causing the display range to display the third image at the third resolution;
(d) while changing the display range at the first deceleration speed, determine that the display range has reached a boundary line of a cluster region after the request to terminate the change of the display range using the zoom operation and before the change of the display range using the zoom operation is terminated; and
(e) in response to the display range reaching the boundary line of the cluster region, increase the deceleration such that the display range is changed at a second deceleration speed.

21. A non-transitory computer-readable medium storing instructions structured to cause an information processing apparatus to:
(a) cause a display device to display a first image in a display range, the first image being from images associated with an observation target object, the images including the first image, which is generated at a first resolution, a second image, which is generated at a second resolution different from the first resolution, and a third image, which is generated at a third resolution different from the first resolution and the second resolution, wherein the images are divided into a plurality of cluster regions having boundary lines;
(b) in response to a request from an input device to change the display range using a zoom operation:
(i) change the display range at a first speed; and
(ii) cause the display range to display the second image at the second resolution;
(c) in response to a request from an input device to terminate the change of the display range using the zoom operation:
(i) change the display range at a first deceleration speed, which is slower than the first speed, and maintain movement at the first deceleration speed, based on the request from the input device to terminate the change of the display range using the zoom operation; and
(ii) cause the display range to display the third image at the third resolution;
(d) while changing the display range at the first deceleration speed, determine that the display range has reached a boundary line of a cluster region after the request to terminate the change of the display range using the zoom operation and before the change of the display range using the zoom operation is terminated; and
(e) in response to the display range reaching the boundary line of the cluster region, increase the deceleration such that the display range is changed at a second deceleration speed.

* * * * *